United States Patent
Domian et al.

(10) Patent No.: US 6,244,402 B1
(45) Date of Patent: Jun. 12, 2001

(54) POWER SHIFT TRANSMISSION FOR MOTOR VEHICLES

(75) Inventors: Hans-Jörg Domian, Immenstaad; Ralf Dreibholz, Meckenbeuren; Walter Kuhn, Friedrichshafen, all of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/202,262

(22) PCT Filed: Jun. 19, 1997

(86) PCT No.: PCT/EP97/03198

§ 371 Date: Dec. 10, 1998

§ 102(e) Date: Dec. 10, 1998

(87) PCT Pub. No.: WO97/49573

PCT Pub. Date: Dec. 31, 1997

(30) Foreign Application Priority Data

Jun. 25, 1996 (DE) ................................................ 196 25 355

(51) Int. Cl.⁷ ............................ B60R 41/28; F16D 67/00
(52) U.S. Cl. ..................... 192/3.51; 192/3.52; 477/167; 477/176
(58) Field of Search .................. 192/3.55, 3.51, 192/3.52, 219.3, 12 B, 12 D, 13 A; 475/269, 284; 477/210, 277, 167, 174; 74/335, 336 R

(56) References Cited

U.S. PATENT DOCUMENTS 4,487,303   12/1984   Boueri et al. .
4,817,462   4/1989   Dach et al. ............................ 84/740
4,867,291 * 9/1989   Holman et al. ...................... 192/4 A
5,474,164   12/1995   Berger .
5,836,849 * 11/1998   Mathiak et al. ..................... 475/269
5,911,648 * 6/1999   Dreibholz et al. ................... 477/154

FOREIGN PATENT DOCUMENTS

| | | |
|---|---|---|
| 2 003 977 | 8/1971 | (DE) . |
| 40 25 420 C2 | 12/1992 | (DE) . |
| 0 214 989 B1 | 3/1987 | (EP) . |
| 0 251 156 A2 | 1/1988 | (EP) . |
| 0338219 * | 2/1989 | (EP) ................................. 475/269 |
| 0 517 420 A2 | 12/1992 | (EP) . |
| 0 681 123 A2 | 11/1995 | (EP) . |

OTHER PUBLICATIONS

Japanese Abstract, vol. 010, No. 277 (M–519) dated Sep. 19, 1986 to Nissan Motor Co. Ltd).

* cited by examiner

Primary Examiner—Rodney H. Bonck
Assistant Examiner—Tisha D. Waddell
(74) Attorney, Agent, or Firm—Davis & Bujold, P.L.L.C.

(57) ABSTRACT

A power shift transmission (3) for motor vehicles in which instead of a hydrodynamic torque converter a controlled or regulated multiple disc clutch serves to assist starting. The loading of clutch is minimized by a fitted catch which prevents the motor vehicle from rolling in the opposite direction to the direction of travel intended by the gear selection. Catch can take the form of a mechanical catch, as sprag unit, or the form of an electronically adjusted catch which acts on one and/or more transmission brakes and/or clutches and/or into the service brake of the vehicle.

10 Claims, 1 Drawing Sheet

POWER SHIFT TRANSMISSION FOR MOTOR VEHICLES

Figure 1:
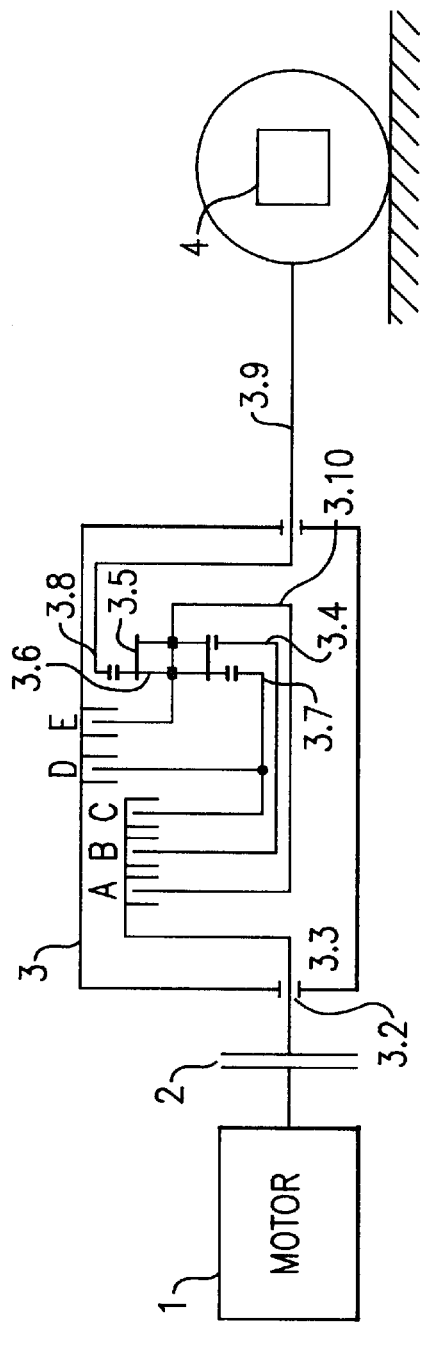

The invention concerns a power shift transmission for motor vehicles and automotive construction machinery.

BACKGROUND OF THE INVENTION

Power shift transmissions in general have one hydrodynamic converter as starting device. Such converters require great space and involve power loss to hydraulic and churning losses. In order to reduce the length of the transmission and prevent such power losses, the converter has been eliminated in a special development of the invention described in European patent No. 0 214 989 B2, its function as starting component being assumed by a transmission brake. Such a brake is, however, severely stressed.

SUMMARY OF THE INVENTION

The problem on which the invention is based is to provide a compact, economical and wear resistant starting device of long service life and high efficiency.

According to the invention, this problem is solved by a front-mounted, regulated multiple disc clutch wherein a one-way clutch prevents the motor vehicle from rolling opposite to the travel direction intended by the gear selection.

To design the multiple disc clutch as compact as possible, the loading of the clutch must be kept low. At the same time, the clutch must be operated only as briefly as possible under drag in order to minimize its wear and thermal stress. In any case, the vehicle must not be held with the clutch on hills. To avoid such a load the power shift transmission has said one-way clutch which prevents the vehicle from rolling opposite to the travel direction intended by a gear selection.

Another solution of the problem, on which the invention is based and for which separate protection is claimed, is to design the regulated gear clutch as compact, economical and wear resistant starting device. This is advantageous insofar as there is already a gear clutch in power shift transmissions. Such a gear clutch serving as starting device must be dimensioned only somewhat larger. The regulation ensures that the gear clutch be thermally loaded and used up as little as possible. Length and weight of the power shift transmission are considerably reduced in this solution, since the hydrodynamic converter is eliminated and also no separate front mounted clutch is needed.

The gear clutch is preferably a regulated multiple disc clutch.

In such a gear clutch designed to act as integrated starting clutch and is a regulated multiple disc clutch, a one-way clutch advantageously prevents the rolling of the vehicle opposite to the travel direction intended by a gear selection.

In an advantageous development of the invention, the one-way clutch is designed as free wheel unit, especially as sprag unit or pawl unit.

The one-way clutch (free wheel unit) is preferably mounted on the input shaft of the power shift transmission, that is, on the side of the multiple disc clutch facing the transmission, especially in the area of the multiple disc clutch.

Alternatively to a free wheel unit, an unintended rolling opposite to the travel direction can be prevented by an electronic gearshift system which acts upon shifting components. One possibility here is to activate the service brake in case of an unintended rolling. The brake system must here, of course, be synchronized with the transmission system. Another possibility is to design the one-way clutch in the transmission combined with the starting clutch as closed system (transmission brake). The braking action is preferably obtained by adjusting in the transmission a combination of shifting components which blocks the output of the transmission. The electronic control of said transmission brake must be effected as an overlapping control, that is, when the starting clutch begins to grip, the braking action of a shifting component is released to the same extent the starting clutch absorbs the torque. How strong the retaining torque overlap must be depends on the drive force of the vehicle due to a downhill gradient. The retaining torque of the transmission brake, which is determined by the overlapping control, is advantageously adapted to this drive force. Thus, there are no frictional losses that are great enough to destroy the mechanical power and produce unneeded thermal load.

When the vehicle weight is known, this drive force can be determined by its effect upon the vehicle, that is, by the acceleration of the vehicle during a very brief testing time within which the vehicle hardly noticeably rolls away. This requires measuring of the angular velocity of the transmission output shaft and a power calculation from the change in angular velocity.

Alternatively, the drive force resulting from a slope can be determined by measuring the torque of the transmission output shaft resulting therefrom.

In another development of the invention, the slope output power is determined, when the vehicle weight is known, by means of a gradient sensor.

When the vehicle weight is known the drive power is advantageously found by a change of the transmission output speed.

The multiple disc clutch may be a wet clutch in order to obtain a good dissipation of heat.

Another solution of the problem on which the invention is based and for which separate protection is claimed is to design a regulated transmission brake as a compact, economical and wear resistant starting device wherein by activating the service brake an overlapping shift prevents the motor vehicle from rolling opposite to the travel direction intended by the gear selection. This is advantageous insofar as there is in any case a transmission brake in power shift transmissions. Said transmission brake serving as starting device must be dimensioned somewhat larger. The regulation ensures that the transmission brake be thermally loaded and used up as little as possible. Length and weight of the power shift transmission are considerably reduced in this solution, since the hydrodynamic converter is eliminated and also no separate front-mounted clutch is needed.

BRIEF DESCRIPTION OF THE DRAWING(S)

Figure 2:
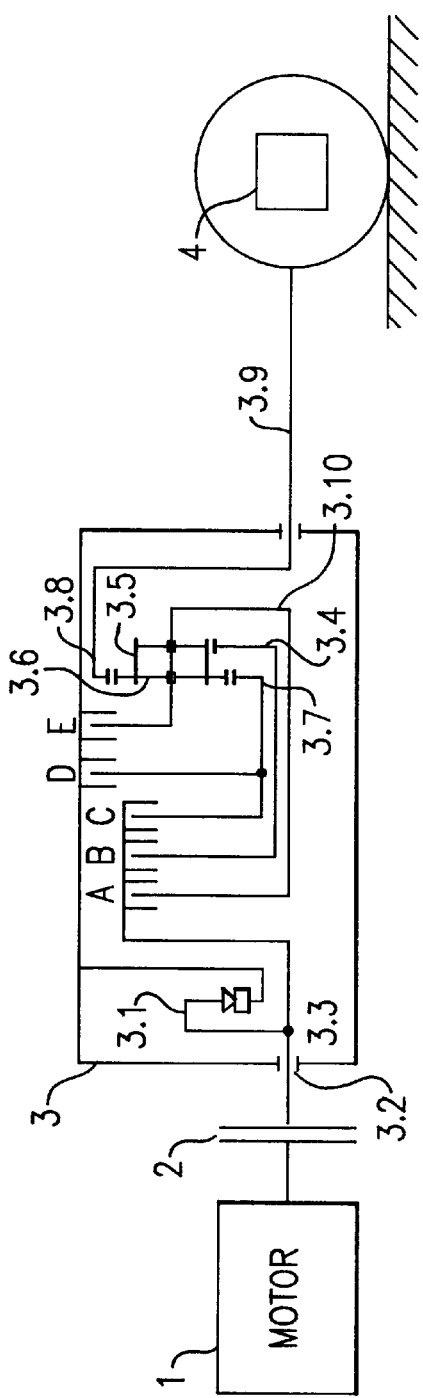

Two embodiments of the invention are illustrated in the drawings which show:

FIG. 1 diagrammatically shows a power transmission of a motor vehicle with power shift transmission; and FIG. 2 shows said power transmission course with a free wheel unit on the input shaft against the transmission housing.

DESCRIPTION OF THE PREFERRED EMBODIMENTS

An engine 1 drives a vehicle, via a starting clutch 2, designed as a wet multiple disc clutch and a power shift transmission 3, together with a rear-mounted differential gear 4.

In the embodiment of the invention, shown in FIG. 2, a mechanical free wheel unit 3.1 between transmission input shaft 3.2 and transmission housing 3.3 prevents rotation of said shaft opposite to the engine direction of rotation. In forward gears engaged in the power shift transmission 3 this is a rear rolling stop and in engaged reverse gear a forward rolling stop, that is, in both cases unintended rolling of the motor vehicle opposite to the travel direction intended by the gear selection is prevented.

In the embodiment of the invention shown in FIG. 1, the free wheel, which prevents rolling of the vehicle opposite to the travel direction intended by the gear selection, is designed as an electronically regulated stop which acts by activation of the above mentioned combination of shifting components. In this case, the rolling of the motor vehicle opposite to the travel direction intended by the gear selection is prevented by a combination of shifting components in the transmission blocking the transmission output. This is done as follows:

1st Case: Forward start with the first gear:
The brakes D and E are applied and the clutch B is engaged. When the starting clutch 2 begins to grip, the brake D is released in the proportion in which the starting clutch absorbs the torque. The sun gear 3.4 of larger radius, which is driven by the clutch B, drives the planetary gear 3.5 which, in turn, drives the planetary gear 3.6. If the retaining torque of the brake D is removed, the sun gear 3.7 of smaller radius begins to turn in opposite direction to the sun gear 3.4 of larger radius. Thus, the ring gear 3.8 can start turning in the direction of rotation of the sun gear 3.4 of larger radius. The power on the gearing of the ring gear 3.8 conditioned by the slope drive output of the vehicle and by the torque of the transmission output shaft 3.9 resulting therefrom, which via the planetary gears 3.5 and 3.6 is transmitted to both sun gears 3.4 and 3.7, is redistributed by the sun gear 3.7 of smaller radius to the sun gear 3.4 of larger radius.

2$^{nd}$ Case: Forward start with the second gear:
The brakes D and E are applied and the clutch B is engaged. When the starting clutch 2 begins to grip, the brake E is released in the proportion in which the starting clutch absorbs the torque. The sun gear 3.4 of larger radius, which is driven by the clutch B, drives the planetary gear 3.5 which, in turn, drives the planetary gear 3.6. If the retaining torque of the brake E is removed, the planet carrier 3.10 starts turning, since the planetary gear 3.6 has rolled away to the stalled sun gear 3.7 of smaller radius. The planetary gear 3.6 drives the ring gear 3.8. Thus the ring gear 3.8 can start turning in the direction of rotation of the sun gear 3.4 of larger radius. The power on the gearing of the ring gear 3.8 conditioned by the slope drive output of the vehicle and by the torque of the transmission output shaft 3.9 resulting therefrom, which via the planetary gears 3.5 and 3.6 is transmitted to the sun gear 3.7 of smaller radius and the planet carrier 3.10, is redistributed by the planet carrier 3.10 to the sun gear 3.4 of larger radius.

3$^{rd}$ Case: Start with the reverse gear:
The brakes D and E are applied and the clutch C is engaged. When the starting clutch 2 begins to grip, the brake D is released in proportion in which the starting clutch absorbs the torque. The sun gear 3.7 of smaller radius, which is driven by the clutch C, drives the planetary gear 3.6. If the retaining torque of the brake D is removed, the sun gear 3.7 of smaller radius begins to turn. The planetary gear 3.6 begins to turn in opposite direction to the sun gear 3.7 of smaller radius. Thus, the ring gear 3.8 begins turning in opposite direction to the sun gear 3.7 of smaller radius. The power on the gearing of the ring gear 3.8 conditioned by the slope drive output of the vehicle and by the torque resulting therefrom of the transmission output shaft 3.9, which is transmitted via the ring gear 3.8 and the planetary gear 3.6 to the sun gear 3.7 of smaller radius, is redistributed by the brake D to the gear clutch C.

In the independent solution of the problem on which the invention is based in the form of the regulated gear clutch as starting device for which separate protection is claimed, the start clutch 2 of FIG. 1 is eliminated. The clutch B is given larger dimensions for the purpose and serves as a starting clutch. To start, it is disengaged with regulation, the first gear is thus engaged. For starting in reverse, the clutch C is closed with regulation. Said clutch as a starting clutch is also dimensioned larger. The start in reverse is, of course, not as frequent as the forward start so that the requirement regarding wear on the clutch C is not as strict as in the clutch B.

The clutches B and C are advantageously further unloaded by overlapping gearshifts.

The forward start is formed as follows: The brakes D and E are applied and the clutch B engaged. When the clutch B starts to grip, the brake D is released in the proportion in which the clutch B absorbs torque.

The start in reverse is analogously formed as follows: The brakes D and E are applied and the clutch C is engaged. When the clutch C begins to grip, the brake D is released in the proportion in which the clutch C absorbs torque.

In the second independent solution of the problem on which the invention is based and for which separate protection is claimed, in which one regulated transmission brake serves as starting device and an overlapping gearshift prevents, by activating the service brake, the rolling of the vehicle opposite to the travel direction intended by the gear selection, the starting clutch 2 of FIG. 1 is eliminated. The brake E is made of larger dimensions for that and serves as starting clutch. To start in first gear, the clutch B is disengaged. The service brakes is applied so that the vehicle cannot roll away. As long as the brake E is disengaged, the planet carrier 3.10 can freely turn and thus transmits no torque to the ring gear 3.8. The planetary gear 3.6 meshing with the ring gear 3.8 rolls here upon the latter. To start, the brake E is now disengaged with regulation and in the proportion in which the planet carrier absorbs torque, the service brake is released. To start in reverse gear, the clutch C is engaged. The starting process develops in the same way as above. The service brake is applied so that the vehicle cannot roll away. As long as the brake E is open, the planet carrier 3.10 can freely turn and thus transmits no torque to the ring gear 3.8. The planetary gear 3.6 meshed with the ring gear 3.8 rolls here upon the latter. To start, the brake E is now engaged with regulation and in the proportion in which the planet carrier absorbs torque, the service brake is released.

| Reference numerals | | | |
|---|---|---|---|
| 1 | engine | 3.5 | planetary gear |
| 2 | starting clutch | 3.6 | planetary gear |
| 3 | power shift transmission | 3.7 | sun gear |
| 3.1 | free wheel unit | 3.8 | ring gear |
| 3.2 | transmission input shaft | 3.9 | transmission output shaft |
| 3.3 | transmission housing | 3.10 | planet carrier |
| 3.4 | sun gear | 4 | differential gear |

What is claimed is:
1. A power shift transmission for a motor vehicle, the power shift transmission having a transmission input shaft for receiving a driving input from a prime mover and a transmission output shaft for transmitting an output of the power shift transmission and powering a vehicle incorporating the power shift transmission;

a starting device coupled to the transmission input shaft for receiving the driving input from a prime mover and supplying the driving input to the transmission input shaft;

a catch for preventing a vehicle from rolling in a direction opposite to a travel direction intended by a selected gear of the power shift transmission, and the catch being an electronically regulated component which is operated by activation of a service brake;

the power shift transmission includes a planetary gear and the service brake is a brake which acts upon at least one component of the planetary gear; and the service brake and the starting clutch (2) are both regulated by an overlapping control.

2. The power shift transmission according to claim 1, wherein the starting device is one of a front-mounted starting clutch (2), a gear clutch, and a transmission brake.

3. The power shift transmission according to claim 2, wherein the starting device is a gear clutch which is a multiple disc wet clutch.

4. A power shift transmission for a motor vehicle, the power shift transmission having a transmission input shaft for receiving a driving input from a prime mover and a transmission output shaft for transmitting an output of the sower shift transmission and powering a vehicle incorporating the power shift transmission;

a starting device coupled to the transmission input shaft for receiving the driving input from a prime mover and supplying the driving input to the transmission input shaft;

a catch for preventing a vehicle from rolling in a direction opposite to a travel direction intended by a selected gear of the power shift transmission, and the catch being an electronically regulated component which is operated by activation of a service brake;

the power shift transmission includes a planetary gear and the service brake is a brake which acts upon at least one component of the planetary gear; and the service brake and the starting clutch (2) are both regulated by an overlapping control;

wherein the overlapping control is regulated depending on a drive force created by a ground slope.

5. The power shift transmission according to claim 1, wherein the transmission output shaft is coupled to a differential gear (4).

6. The power shift transmission according to claim 4, wherein the drive force is calculated by an action upon the transmission output shaft (3.9).

7. The power shift transmission according to claim 4, wherein the drive force is determined by one of a power sensor and a torque sensor.

8. The power shift transmission according to claim 4, wherein the drive force is determined by a gradient sensor.

9. The power shift transmission according to claim 4, wherein the drive force is detected by a rate of change of an output speed of the power shift transmission.

10. A power shift transmission for a motor vehicle, the power shift transmission having a transmission input shaft for receiving a driving input from a prime mover and a transmission output shaft for transmitting an output of the power shift transmission and powering a vehicle incorporating the power shift transmission;

a starting device coupled to the transmission input shaft for receiving the driving input from a prime mover and supplying the driving input to the transmission input shaft;

a catch for preventing a vehicle from rolling in a direction opposite to a travel direction intended by a selected gear of the power shift transmission, and the catch being an electronically regulated component which is operated by activation of a service brake; and the service brake and the starting clutch (2) are both regulated by an overlapping control.

* * * * *